US010045358B2

(12) United States Patent
Berggren et al.

(10) Patent No.: US 10,045,358 B2
(45) Date of Patent: Aug. 7, 2018

(54) RELAYING IN CELLULAR NETWORKS

(71) Applicant: Sony Corporation, Tokyo (JP)

(72) Inventors: Anders Berggren, Lund (SE); Rickard Ljung, Helsingborg (SE)

(73) Assignee: Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/719,216

(22) Filed: May 21, 2015

(65) Prior Publication Data

US 2016/0286564 A1  Sep. 29, 2016

Related U.S. Application Data

(63) Continuation of application No. PCT/EP2015/056375, filed on Mar. 25, 2015.

(51) Int. Cl.
*H04W 72/00* (2009.01)
*H04W 72/08* (2009.01)
*H04W 76/14* (2018.01)
*H04W 76/15* (2018.01)
*H04B 7/155* (2006.01)
*H04W 88/04* (2009.01)

(52) U.S. Cl.
CPC ...... *H04W 72/085* (2013.01); *H04B 7/15557* (2013.01); *H04W 76/14* (2018.02); *H04W 76/15* (2018.02); *H04W 88/04* (2013.01)

(58) Field of Classification Search
CPC .......................... H04W 76/023; H04W 72/085
USPC ............................................... 455/450, 422.1
See application file for complete search history.

(56) References Cited

U.S. PATENT DOCUMENTS

| | | | |
|---|---|---|---|
| 7,957,347 B1 | 6/2011 | Loc et al. | |
| 2003/0103492 A1* | 6/2003 | Tanimoto | H04L 12/5692 370/351 |
| 2004/0057407 A1 | 3/2004 | Balachandran et al. | |
| 2005/0226198 A1 | 10/2005 | Barak et al. | |
| 2008/0225783 A1 | 9/2008 | Wang et al. | |
| 2009/0201846 A1 | 3/2009 | Horn et al. | |
| 2011/0117907 A1* | 5/2011 | Hooli | H04W 72/02 455/422.1 |
| 2011/0134827 A1 | 6/2011 | Hooli et al. | |
| 2011/0235571 A1 | 9/2011 | Seo et al. | |
| 2013/0005329 A1* | 1/2013 | Kawasaki | H04B 7/155 455/422.1 |
| 2013/0163508 A1 | 6/2013 | Yu et al. | |

(Continued)

FOREIGN PATENT DOCUMENTS

| | | | |
|---|---|---|---|
| EP | 2 670 206 A1 | 12/2013 | |
| WO | WO 2010/006649 A1 | 1/2010 | |
| WO | WO 2012/028200 A1 | 3/2012 | |

OTHER PUBLICATIONS

3GPP, Technical Report—"3rd Generation Partnership Project; Technical Specification Group Services and System Aspects; Study on extended architecture support for proximity-based services (Release 13)", 3GPP TR 23.713 V1.0.0 (Feb. 2015), 59 pp.

(Continued)

*Primary Examiner* — Charles Shedrick
(74) *Attorney, Agent, or Firm* — Myers Bigel, P.A.

(57) ABSTRACT

In a situation where a direct channel (191) and a relaying channel (192) of a radio interface of a cellular network (100) are available to transmit data: selecting between the relaying channel (192) and the direct channel (191).

19 Claims, 8 Drawing Sheets

(56) References Cited

U.S. PATENT DOCUMENTS

| | | | |
|---|---|---|---|
| 2013/0190000 A1 | 7/2013 | Boudreau et al. | |
| 2014/0010212 A1 | 1/2014 | McNamara et al. | |
| 2014/0171062 A1* | 6/2014 | Fallgren | H04W 40/22 455/422.1 |
| 2014/0321367 A1 | 10/2014 | Marupaduga | |
| 2015/0029866 A1* | 1/2015 | Liao | H04W 4/008 370/241 |
| 2015/0189645 A1 | 7/2015 | Maeda et al. | |
| 2015/0237649 A1 | 8/2015 | Zhang et al. | |
| 2016/0219596 A1 | 7/2016 | Yanover et al. | |
| 2017/0085573 A1* | 3/2017 | Zhang | H04W 12/02 |

OTHER PUBLICATIONS

3GPP, Technical Specification—"3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401 V13.2.0 (Mar. 2015), 313 pp.

3GPP, Technical Specification—"3rd Generation Partnership Project; Technical Specification Group Core Network and Terminals; Mobile radio interface Layer 3 specification; Core network protocols; Stage 3 (Release 13)", 3GPP TS 24.008 V13.1.0 (Mar. 2015), 714 pp.

International Search Report and Written Opinion of the International Searching Authority, Application No. PCT/EP2015/070348, dated May 30, 2016.

CATT, "Discussion on UE-to-Network Relays operation", Agenda item: 7.2.3.2.1, Document for: Discussion and Decision, 3GPP TSG RAN WG1 Meeting #80bis, R1-151353, Belgrade Serbia, Apr. 20-24, 2015, 3 pp.

Zhang et al., "Performance Analysis of Scheduling Algorithms in the Relay-Aided Cellular Networks", *IEEE 2010 International Conference on Communications, Circuits and Systems(ICCCAS)*, Chengdu, China, Jul. 28, 2010, pp. 122-125.

International Search Report and Written Opinion of the International Searching Authority, Application No. PCT/EP2015/056375, dated Dec. 7, 2015.

Chu et al., "Adaptive Modulation and Coding with Queue Awareness in Cognitive Incremental Decode- and-Forward Relay Networks", IEEE ICC 2014, Cognitive Radio and Networks Symposium, 8 pages.

Wang et al., "Adaptive Relaying Method Selection for Multi-Rate Wireless Networks with Network Coding", IEEE Communications Letters, vol. 16, No. 12, Dec. 2012, 4 pages.

PCT Written Opinion and Search Report corresponding to International Application No. PCT/EP2015/056553, dated Nov. 26, 2015 (10 pages).

* cited by examiner

RELAYING IN CELLULAR NETWORKS

CROSS REFERENCE TO RELATED APPLICATION

This application is a continuation under 35 U.S.C. § 111(a) of PCT International Application No. PCT/EP2015/056375, filed on Mar. 25, 2015, the disclosure and content of which is incorporated by reference herein in its entirety.

TECHNICAL FIELD

Various embodiments relate to a device and to a method. In particular, various embodiments relate to selecting between a direct channel and a relaying channel of a radio interface of a cellular network in a situation where the direct channel and the relying channel are available to transmit data.

BACKGROUND

In the Third Generation Partnership Project (3GPP) Long Term Evolution (LTE) radio access technology, relaying is a technique of extending a coverage area of a cell of a cellular network. Here, instead of establishing a direct connection with an access node of the wireless network, a communication device (UE) connects with a relay which wirelessly forwards or relays data to the access node of the cellular network. Such a scenario is typically referred to cell-edge extension, because the UE is able to connect to the relay albeit located outside the range of the access node; hence, in such a scenario, a direct channel of the radio interface of the cellular network between the UE and the access node is not available.

However, such techniques face certain restrictions. E.g., it is not possible or only possible to a limited degree to flexibly select between direct communication with the cellular network and relaying connection with the cellular network in different scenarios and use cases. Relaying is limited to the cell-edge extension scenario as explained above.

SUMMARY

Therefore, it would be desirable to provide advanced techniques of relaying. In particular, a need exists to flexibly employ relaying in scenarios where the UE and/or the cellular network can benefit from such a prioritization of the relaying channel over the direct channel.

This need is met by the features of the independent claims. The dependent claims define embodiments.

According to an aspect, a device is provided. The device comprises at the least one processor configured to select between a relaying channel of a radio interface of a cellular network and a direct channel of the radio interface in a situation where the direct channel and the relaying channel are available to transmit data. The device further comprises an interface. The interface is configured to transmit the data employing the selected one of the direct channel and the relaying channel.

According to a further aspect, a method is provided. The method comprises, in a situation where a direct channel of a radio interface of a cellular network and a relaying channel of the radio interface are available to transmit data: selecting between the relaying channel and the direct channel. The method further comprises transmitting the data employing selected one of the direct channel and the relaying channel.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

In the following, the invention will be explained in further detail with respect to embodiments illustrated in the accompanying drawings.

DETAILED DESCRIPTION

Figure 1:
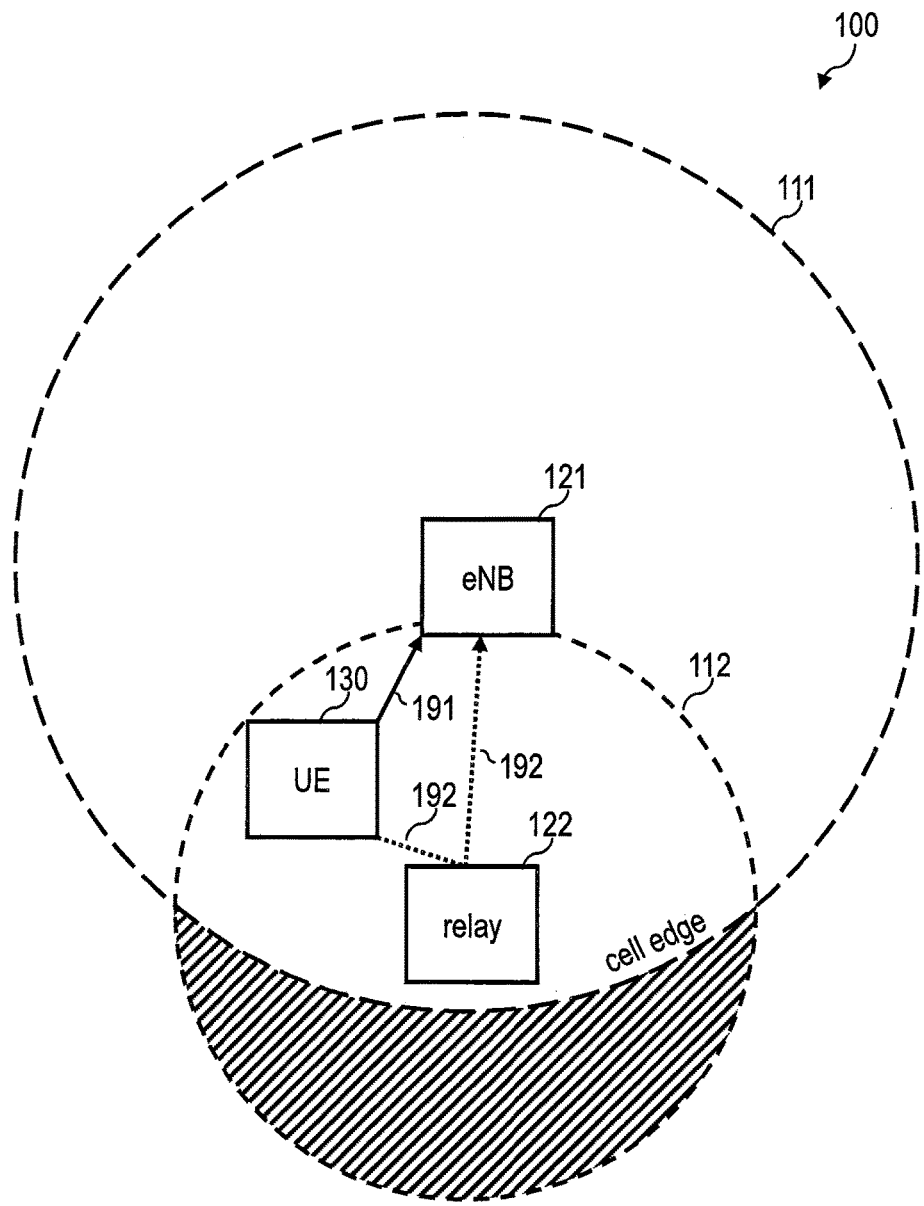
FIG. 1 schematically illustrates a cellular network where communication between a UE and an access node of the cellular network is possible via a direct channel and a relaying channel.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques are illustrated which allow to flexibly select between a relaying channel and a direct channel for communication on a radio interface of a cellular network. This allows determining whether data transmission would benefit from either the direct channel or the relaying channel; then, it is possible to select between said direct channel and said relaying channel depending on said determining.

Turning to FIG. 1, a scenario is shown where a UE 130 is attached to a cellular network 100. The radio interface of the cellular network 100 is established between an access node 121 of the cellular network 100 and the UE 130. The radio interface offers a direct channel 191 and a relaying channel 192 (illustrated in FIG. 1 by the dotted line) established via a relay 122. The relaying channel 192 comprises a first communication section in-between the UE 130 and the relay 122 where data transmission on the radio interface is possible; the relaying channel 192 also comprises a second communication section in-between the relay 122 and the eNB 121 where data transmission on the radio interface is possible. The relay 122 forwards data received on the first (second) communication section of the relaying channel 192 along the second (first) communication section.

In FIG. 1, the relay 122 is deployed close to an edge of a cell 111 of the cellular network 100 associated with the access node 121. In FIG. 1, a sub-cell 112 associated with the relay 122 illustrated in the sub-cell 112 transceiving of signals to and from the relay 122 via the radio interface is possible. Thus, the sub-cell 112 of the relay 120 effectively enhances the coverage area of the cellular network 100 (shown in FIG. 1 by the diagonally dashed area).

Considering a scenario where the UE 130 is located in the diagonally dashed area, only the relaying channel 192 is available to transmit data via the radio interface; this is because the UE 130 is effectively located outside the range of the access node 121 and it is not possible to transceive signals to and from the relay 122.

Differently, as illustrated in FIG. 1, the UE 130 is located in-between the access node 121 and the relay 122. Because of this, both, the direct channel 191 and the relaying channel 192 are available to transmit data. Thus, it is possible to select between the direct channel 191 and the relaying channel 192. Hereinafter, techniques are described with respect to said selecting. In particular, hereinafter, various decisions criterions to be taken into account in said selecting are described.

More specifically, the direct channel 191 and/or the relaying channel 192 being available to transmit data may refer to at least one of the following: a signal level of the corresponding channel 191, 192 being above a threshold; the data transmission via the respective channel 191, 192 fulfilling quality of service (QOS) requirements of the data; a mobility of the UE 130 indicating that the data transmission via the respective channel 191, 192 will be available within the near future. In other words, the data transmission via the respective channel 191, 192 being available can correspond to a scenario where stable and lasting transmission via the respective channel 191, 192 is expected to be possible. Such a scenario in particular does not correspond to the reference implementation where the coverage area, as explained above is extended, i.e., the cell-edge scenario.

By implementing said selecting between the direct channel 191 and the relaying channel 192, new functionality can be provided. Here, one of the two channels 191, 192 can be prioritized over the other. This allows to flexibly select the appropriate channel 191, 192 in a scenario where said selecting allows to achieve benefits of different kinds. E.g., it could be possible to reduce power consumption, optimize resource allocation, reduce interference into channels of other communication devices, etc. by said flexibly selecting.

Generally, it is possible that the relay 122 is an entity of the cellular network 100 which is purposely deployed at a given location. E.g., the relay 121 may be referred to as a relay node of the cellular network 100. However, in various scenarios, it is also possible that the relaying channel 192 is a device-to-device (D2D) relaying channel. Here, it is possible that the relay 122 is a further UE which implements the relaying functionality. In particular in such a scenario of the D2D relaying channel 192 it is possible that, over the course of time, the position of the relay 122 changes. Then, it may become necessary to execute said selecting between the direct channel 191 and the relaying channel 192 anew from time to time; this is because the parameters influencing a decision criterion taken into account when said selecting is executed may vary depending on the particular location of the relay 122. Hence, generally it is possible that said selecting between the direct channel 191 and the relaying channel 192 is in response to detecting a presence of the relay 122 (discovery of the relay) and/or an availability of the relaying channel 192.

Generally, such techniques as mentioned above and as explained hereinafter in further detail, may be readily applied to different kinds of communication networks 100. Hereinafter, a particular focus will be put on the radio access technology according to the 3GPP Longterm Evolution (LTE) standard for illustrative purposes only. This is why in FIG. 1 the access node 121 is labeled evolved Node B (eNB).

Generally, the UE 130 may be a device of different type or kind. E.g., it is possible that the UE 130 is a mobile device of a group comprising a mobile phone, a smartphone, a personal digital assistant, a mobile music player, a smartwatch, a wearable electronic equipment, a camera, an event data recorder, a sensor, an actuator, and a mobile computer. Generally, such techniques as mentioned above may find particular application in machine type communication networks where sensors and actuators are attached to the cellular network 100.

Figure 2:
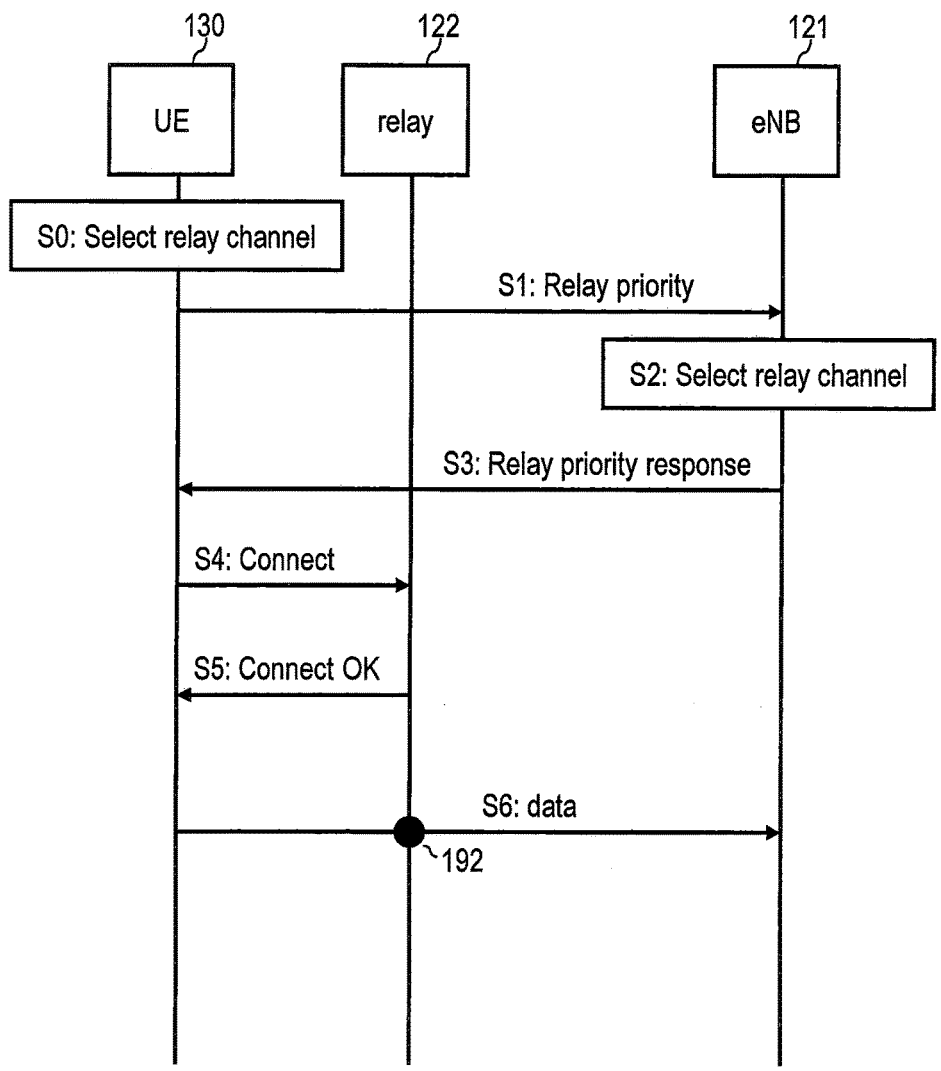
FIG. 2 is a signaling diagram according to various embodiments.

In FIG. 2, a flowchart of a method according to various embodiments is illustrated; here, a so-called relay priority indicator S1 is exchanged between the UE 130 and the eNB 121.

Hence, the outcome of said selecting at S0 is explicitly indicated by means of the relay priority indicator S1 to the eNB 121.

In detail, the UE 130 at S0 selects the relaying channel 192. The relay priority indicator S1 is subsequently sent to the eNB 121. The relay priority indicator S1 prompts the eNB 121 to employ the relaying channel 192. In response to receiving of the relay priority indicator S1, the eNB 121 also selects the relaying channel 192 and confirms said selecting of the relaying channel 192 by sending the relay priority response S3. E.g., the relay priority response may comprise an indication of the relay 122; here, the eNB 121 manages the relaying channel 192 and instructs the UE 130 to connect to the specific relay 122. Alternatively, it is also possible that the UE 130 autonomously discovers the relay 122. E.g., said autonomously discovering of the relay may include performing measurements or exchanging control data with the relay 122, e.g., via a D2D channel of the cellular network 100.

Next, the UE 130 sends a connection request S4 to the relay 122. The relay 122 confirms the connection request by sending a corresponding response message S5. E.g., in case the eNB 122 instructs the UE 130 to use the relay 122 as part of the relay priority response S3, it is also possible that the eNB 121 directly contacts the relay 122 prior to said connection request S4. A confirmation message may also be transmitted between the relay 122 and the eNB 121.

Then data S6 is sent via the relaying channel 192, i.e., by employing the relay 122 as an intermediate node.

As can be seen from the above, the decision logic of selecting the relaying channel 192 in the scenario of FIG. 1 primarily resides in the UE 130. I.e., at S0, the UE 130 prioritizes the relaying channel 192 over the direct channel 191 and correspondingly informs the eNB 121 by the sending the relay priority indicator S1. Then, the eNB 121 selects the relaying channel 192, i.e., uses the relaying priority indicator S1 as the decision criterion.

Figure 3:
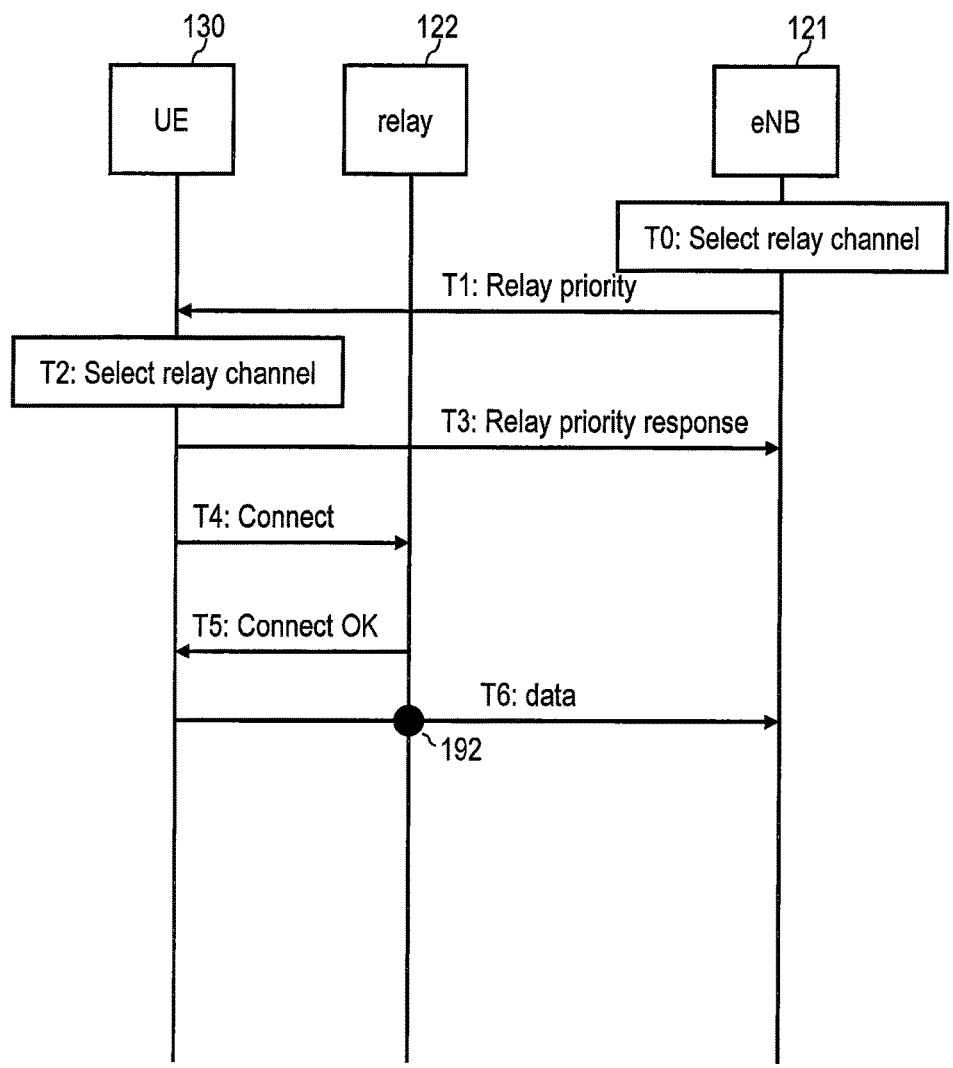
FIG. 3 is a signaling diagram according to various embodiments.

In FIG. 3, a scenario shown where the decision logic for selecting the relaying channel 192 primarily resides in the eNB 121; i.e., here the eNB 121 takes the initiative for prioritization of relaying. In particular, at T0, the eNB 121 selects the relaying channel 192. Then, the relay priority indicator T1 is sent from the eNB 121 to the UE 130. The received relay priority indicator T1 is used as the decision criterion by the UE 130 to select, at T2, the relaying channel 192. The UE 130 sends the relay priority response T3.

Next, the UE 130 sends a connection request T4 to the relay 122. The relay 122 confirms the connection request by sending a corresponding response message T5. Alternatively or additionally to T4, T5 exchanged between the UE 130 and the relay 122, it is also possible that set-up of the relaying channel 192 is controlled by the eNB 121; here, respective control signaling may occur between the eNB 121 and the relay 122.

Then data T6 is sent via the relaying channel 192, i.e., by employing the relay 122 as an intermediate node.

Generally, the decision criterion to select the relaying channel at S0 and T0, respectively, may vary. A possible decision criterion is to reduce the required transmit power of the UE 130. This may allow to prolong battery life of the UE 130 which may be a particular concern in MTC applications where machine-to-machine communication occurs. In this regard, referring to FIG. 1, a scenario may occur where the path loss between the UE 130 and the relay 122 is considerably smaller than the path loss between the UE 130 and the eNB 121; here, employing the relaying channel 192 may be beneficial in order to reduce the required transmit power.

Above, the decision criterion for selecting between the direct channel 191 and the relaying channel 192 has been primarily discussed with respect to the required transmission power. However, alternatively or additionally, other decision criterions are conceivable. Further decision criterions may be selected from a group comprising: a size of the data to be transmitted; a type of the UE 130; a link quality of at least one of the direct channels 191 and the relaying channel 192; a quality of service (QoS) requirement of the data; a type of the data. E.g., the size of the data to be transmitted can correspond to an amount of the data scheduled for transmission in an uplink transmit buffer of the UE 130 and/or a downlink transmit buffer of the eNB 121. The size of the data can, alternatively or additionally, also correspond to a data rate with which the data is provided by a higher-layer application to the transmit buffer.

The link quality of the at least one of the direct channel 191 and the relaying channel 192 can also be referred to as a channel characteristic of the respective channel 191, 192. It may be determined based on a signal-to-noise-and-interference ratio (SINR), a received power, and/or a received channel quality indicator.

The type of the UE 130 may be classified with respect to a kind of data provided by the UE 130; e.g., the UE 130 providing sporadic traffic and/or periodic traffic may be taken into account in said selecting.

Likewise, the type of the data can correspond to uplink data, downlink data, a higher-layer application providing the data, a data rate with which data is provided by the higher-layer application, the data corresponding to sporadic data or periodic data, the data corresponding to best-effort data, and/or the data corresponding to event-triggered data.

As can be seen from the above, various decision criterions are conceivable for said selecting between the direct channel 191 and the relaying channel 192. Typically, the decision basis or input parameters of such decision criterions as mentioned above may change from time-to-time. Then, it may be required to re-execute said selecting and the corresponding control signaling as explained above. Hence, techniques described herein may correspond to a dynamic channel selection.

Figure 4:
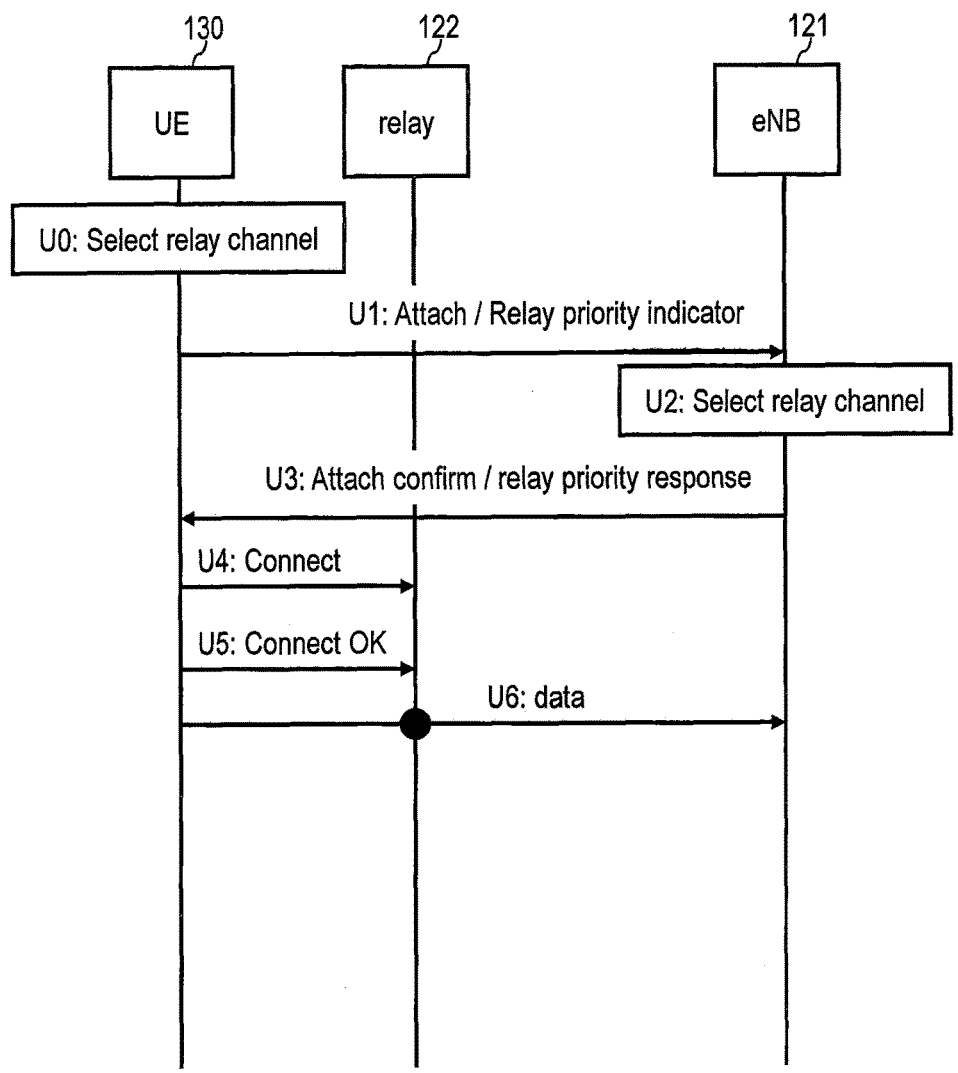
FIG. 4 is a signaling diagram according to various embodiments.

A comparably static scenario is explained below with respect to FIG. 4 where the relay priority indicator U1 is transmitted between the UE 130 and the cellular network 100 as part of an Attach Procedure registering the UE 130 at the cellular network 100. In the scenario of FIG. 4, there is explicit control signaling of the static preference of the UE 130 to employ, e.g., the relaying channel 192. The control signaling occurs upon registration of the UE 130 to the cellular network 100. In particular, the UE 130, at S0, selects the relaying channel 192. Then, the UE 130 sends a control message U1 to the cellular network 100 initiating the Attach procedure. The control message U1 also includes the relaying priority indicator so that, at U2, the eNB 121 also selects the relaying channel 192. Then, the eNB 121 sends an Attach confirm message U3. U4-U6 correspond to S4-S6.

As can be seen from FIG. 4, this scenario is comparable to the scenario discussed above with respect to FIGS. 2 and 3, however, here the priority of the relaying channel 192 is prospectively indicated by the UE 130 during the registration to the cellular network 100 and applicable for all subsequent transmission of the data S6. There is no need for additional control signaling after the Attach procedure is completed.

A further scenario of reduced need of control signaling is where the decision criterion for selecting between data transmission via the direct channel 191 and the relaying channel 192 is a fixed functionality, e.g., of one or more categories of UEs 130. It is possible that said selecting depends on the type of the UE 130. In such a scenario, it is not required to explicitly signal the relay priority indicator S1, T1, U1 (not shown in FIG. 2-4). Instead, according to predefined rules, both, the UE 130 and the eNB 121 expect that all UEs belonging to the applicable UE category will either transmit via the direct channel 191 or via the relaying channel 192. A corresponding predefined rule may be implemented in the cellular network; the predefined rule may indicate that, whenever possible, the UE 130 communicates via the relaying channel 192.

Figure 5:
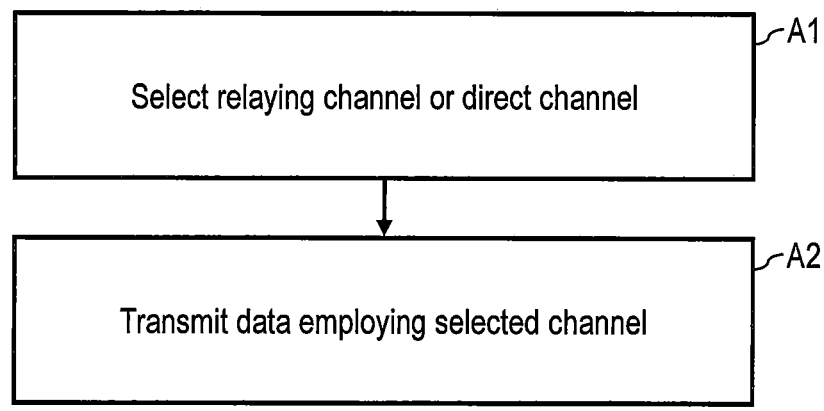
FIG. 5 is a flowchart of a method according to various embodiments.

In FIG. 5, a flowchart illustrates a method according to various embodiments. At A1, it is selected between the relaying channel 192 and the direct channel 191. Depending on where the decision logic for said selecting resides, A1 may be executed by the UE 130 and/or the eNB 121 or any other network node of the cellular network 100. At A2, the data is transmitted employing the selected channel 191, 192, i.e., sent from the UE 130 to the cellular network 100 for uplink transmission (UL) or received by the UE 130 from the cellular network 100 for downlink transmission (DL).

Above, with respect to the various embodiments it has been discussed that the decision logic for discovery of the relay 122 may reside full or partly in the UE 130 and/or fully or partly in the eNB 121. Albeit possible, it is not required that the same entity that contributes to the decision logic of said selecting also includes the decision logic for relay discovery. The identification of a suitable relay 122 can be done, e.g., by utilizing standardized procedures according to D2D functionality. Reference is made, in this regard, to the 3GPP technical recommendations (TR) 23.713, section 7.2. Such techniques may include inter-device communication between any one of the UE 130, the eNB 121, and the relay 122, and/or performing measurements of the link quality.

Figure 6A:
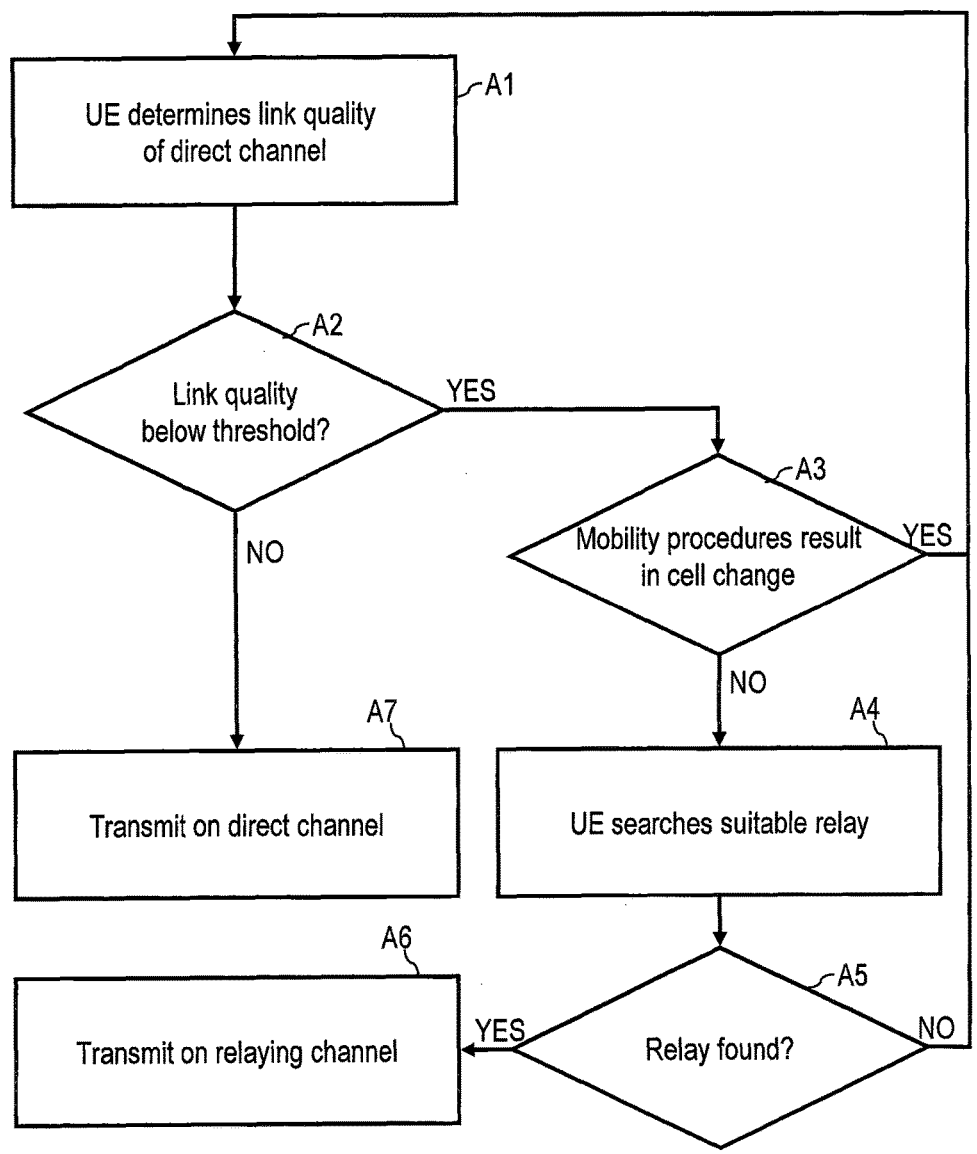
FIG. 6A is a flowchart of a method according to various embodiments and illustrating decision criterions for selecting between the direct channel and the relaying channel in greater detail.

In FIG. 6A, a flowchart illustrating details of the decision-making process when selecting between the direct channel 191 and the relaying channel 192 is depicted. At A1, the UE 130 measures the link quality of the direct channel 191. This may involve, e.g., measuring the received signal power and/or the received signal quality, and/or a channel quality level as indicated as part of control signalling received from the cellular network. A channel quality indicator may be received.

Next, at A2, it is checked whether the determined link quality of A1 is below a predefined threshold. If this is not the case, transmission on the direct channel 191 is commenced at A7. However, if, at A2, it is determined that the link quality is below the predefined threshold, at A3 it is checked whether the mobility procedures of the UE 130 result in a change of the cell 111. E.g., at A3, it is possible to track or trace a previous mobility of the UE 130. If, at A3, it is predicted that the mobility procedures result in a change of the cell 111, the method proceeds with A1. However, if at A3, it is determined that the mobility procedures do not result in a change of the cell 111, at A4 the UE 130 autonomously searches for a suitable relay node.

At A5, it is checked whether the relay 130 fulfilling certain quality requirements has been successfully discovered. Hence, by execution of A4 and A5, the UE 130 may autonomously discover the relay 122. If the relay has been successfully discovered, data transmission commences on the relaying channel 192 at A6.

Above, with respect to FIG. 6A, a scenario has explained where the decision logic for selecting between the relaying channel 192 and the direct channel 191 primarily resides within the UE 130. However, generally it is also possible that the respective steps of FIG. 6A are executed by the eNB 121 and that respective control signalling between the eNB 121 and the UE 130 is employed. In such a scenario, it is possible that the eNB 121 considers a received signal quality, and/or the indicated downlink channel quality level, sometimes referred to as the channel quality indicator (CQI), and/or the received signal power by the eNB 121 when selecting between the direct channel 191 and the relaying channel 122.

Figure 6B:
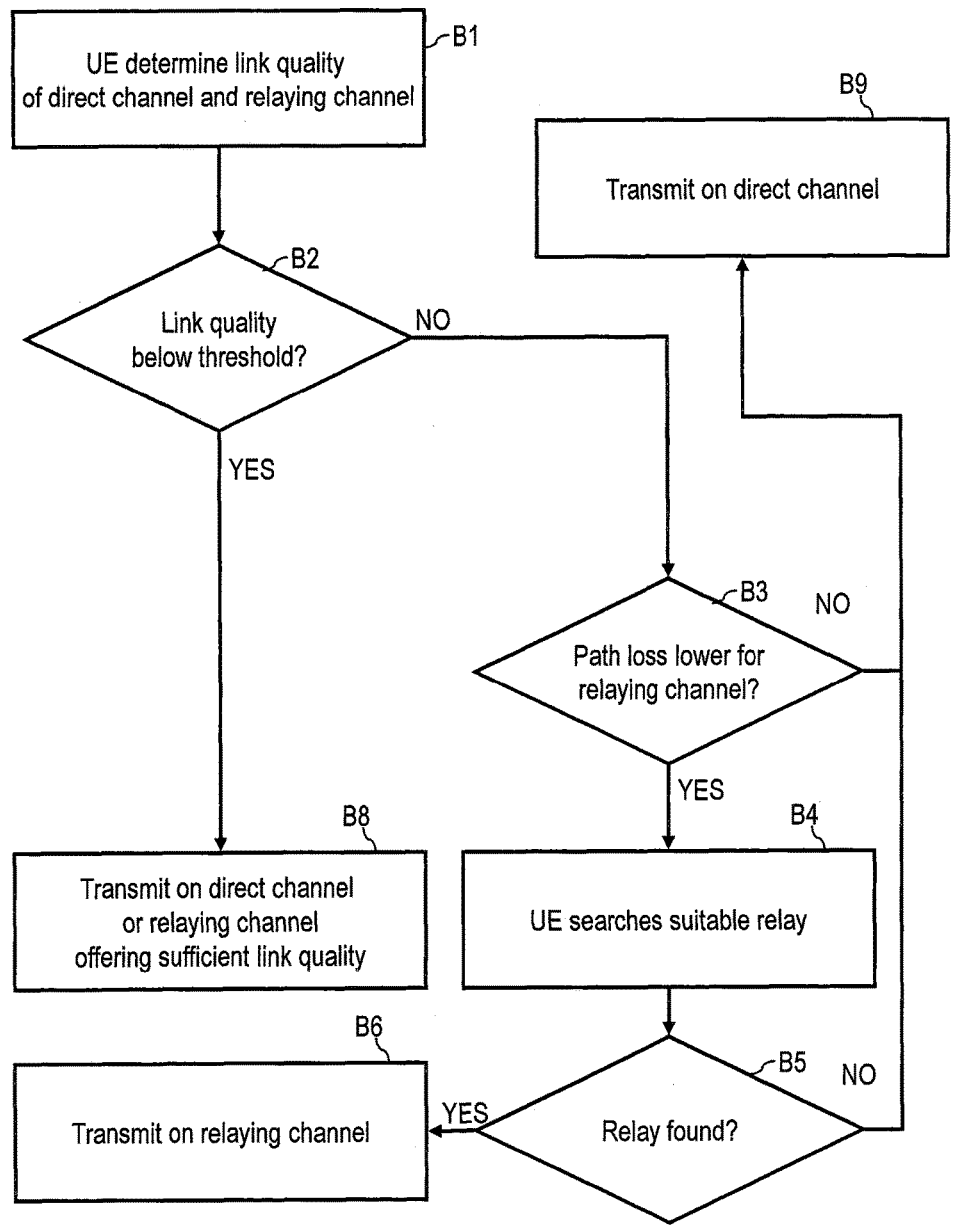
FIG. 6B is a flowchart of a method according to various embodiments and illustrating decision criterions for selecting between the direct channel and the relaying channel in greater detail.

In FIG. 6B, a flowchart illustrates details of the decision-making process when selecting between the direct channel 191 and the relaying channel 192 according to a further embodiment.

At B1, the UE determines the link quality of, both, the direct channel 191 and the relaying channel 192.

Next, at B2, the UE 130 checks whether the link quality of any one of the direct channel 191 and the relaying channel 192 is below a predefined threshold. If this is the case, then a scenario is not present where data transmission is possible on, both, the direct channel 191 and the relaying channel 192. Then, the UE 131 selects the particular one of the two channels 191, 192 which offers reliable data transmission and proceeds to transmit the data on this channel 191, 192 at B8.

However, if the link quality of, both, the direct channel 191 and the relaying channel 192 is above the threshold—i.e., a scenario is present where the data transmission is possible on both the direct channel 191 and the relaying channel 192—the method commences at B3. At B3, it is checked whether the path loss for transmission via the relaying channel 192 is lower than the path loss for transmission via the direct channel 191. If this is not the case, i.e., the required transmission power is higher for transmitting via the relaying channel 192, the method commences at B9 where the data is transmitted via the direct channel 191.

However, if at B3 it is determined that the path loss is lower for the relaying channel 192, the method commences at B4 where the UE searches for a suitable relay 122. Then, at B5, it is checked whether the relay 122 has been successfully discovered and, in the affirmative, data is transmitted via the relaying channel 192 at B6.

Figure 7:
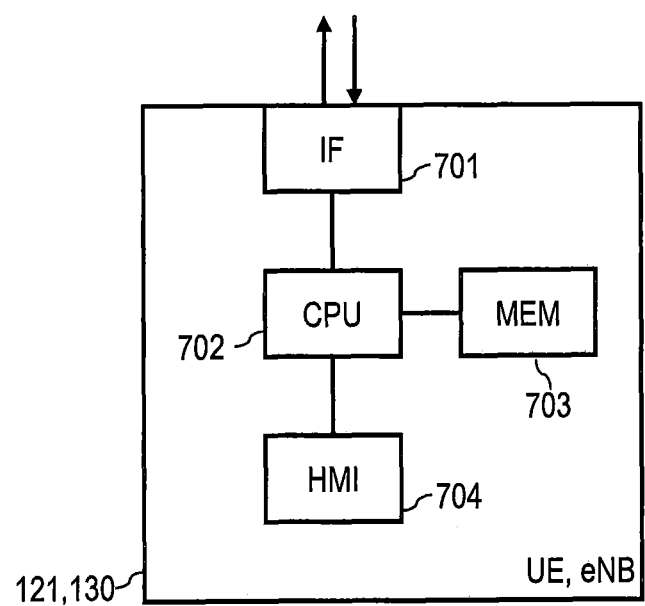
FIG. 7 schematically illustrates a UE and an access node according to various embodiments.

FIG. 7 is a schematic illustration of the UE 130 and the eNB 121, respectively. The device 121, 130 comprises a processor 702. E.g., the processor 702 may be multi-core processor; distributed computing may be employed. The processor 702 is coupled to a memory 703. The memory includes control instructions which, when executed by the processor 702, cause the processor 702 to execute steps and techniques according to the scenarios as described above. E.g., the processor 702 can be configured to select between the direct channel 191 and the relaying channel 192 according to various decision criterions as explained above. Further, the processor 702 may be configured to send and/or receive (transmit) data, including control data and payload data, via an interface 702 of the device 121, 130 to a respective other terminal 130, 121 of the radio interface of the cellular network 100.

The device 121, 130 further comprises a human machine interface (HMI) 704 which is configured to receive instructions and/or output instructions from and to a user of the device 121, 130.

Above, with respect to the various embodiments the relay priority indicator S1, T1, U1 has been discussed. The relay priority indicator S1, T1, U1, generally, may be sent as a dedicated and separate control; however, it is also possible that the relay priority indicator S1, T1, U1 is included in a control message indicating further information. E.g., the relay priority indicator S1, T1, U1 may be included in at least one of the following control messages: tracking area update as specified in 3GPP technical specifications (TS) 23.401; network detach, or service requests as specified in 3GPP TS 24.008.

Generally, it is possible that the relay priority indicator S1, T1, U1 is a Boolean flag, i.e., indicates yes or no. E.g., when the relay priority indicator S1, T1, U1 is set to yes, this may correspond to the UE 130 indicating a preference to transmit the data via the relaying channel 192. Then, the eNB 121 and the cellular network 100 have the information available that the relaying channel 192 is preferred and may utilize proximity service functionality, i.e., UE-to-network relaying to activate such relaying. However, generally, it is also possible that the relay priority indicator includes further information, i.e., more than one bit E.g., it is possible that the relay priority indicator indicates the relay 121, e.g., in a case where the UE 130 and/or the eNB 121—prior to said sending of the relay priority indicator S1, T1, U1—have discovered a suitable relay 122. E.g., it is possible that the UE 130 discovers the relay 122 by employing D2D functionality. In particular in the latter case, the relay priority indicator S1, T1, U1 may be part of a network detach message as explained above.

As explained above with respect to the relay priority indicator S1, T1, U1, the relay priority response S3, T3, may also implemented as a Boolean flag. In such a case, a value of the relay priority response S3, T3, U3 of yes may correspond to the UE 130 and/or the cellular network 100 having decided to activate transmission of data via the relaying channel 192.

Above, techniques have been illustrated which allow to flexibly select between the direct channel and the relaying channel for data transmission between the UE and the cellular network. Such techniques may find application in various use-cases, including MTC networks. One example are a plurality of smart meters placed in a building and being able to communicate with, both, the relay and the eNB. The smart meters may prefer to communicate directly with the eNB or via the intermediate relay, e.g., to optimize power consumption. The relay may include different functionality, such as acting as a proxy. However, it is also possible that the relay includes advanced functionality such as combining messages from several UEs before forwarding them to the cellular network.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. A device, comprising:
at least one processor configured to communicate a control message to prospectively indicate a relative priority between a relaying channel and a direct channel of a radio interface of a cellular network and to subsequently select between the relaying channel and the direct channel in a situation where the direct channel and the relaying channel are available to transmit data scheduled for transmission in a transmit buffer, wherein the at least one processor is configured to analyze the data and select between the relaying channel and the direct channel based at least on a type of the data derived from the analyzing, wherein the direct channel is selected for a first type of data and the relaying channel is selected for a second type of data in accordance with the indicated relative priority; and
an interface configured to transmit the data employing the selected one of the direct channel and the relaying channel;
wherein the device is a User Equipment (UE) communication device connected to the cellular network via the radio interface.

2. The device of claim 1,
wherein the at least one processor is further configured to, in response to selecting the relaying channel, send a control message prompting to employ the relaying channel to a terminal of the radio interface.

3. The device of claim 1,
wherein the at least one processor is configured to receive a control message prompting to employ the relaying channel, and
wherein the at least one processor is further configured to select the relaying channel in response to receiving the control message prompting to employ the relaying channel.

4. The device of claim 2,
wherein the control message prompting to employ the relaying channel is transmitted as part of an Attach procedure of the UE communication device at the cellular network.

5. The device of claim 1,
wherein the at least one processor is configured to select one of the direct channel and the relaying channel based on a transmission power required for transmitting the data on the direct channel and the relaying channel, respectively.

6. The device of claim 1,
wherein the at least one processor is configured to select one of the direct channel and the relaying channel based on a size of the data to be transmitted.

7. The device of claim 1,
wherein the at least one processor is configured to determine a type of the UE communication device connected to the cellular network via the radio interface, and
wherein the at least one processor is configured to select one of the direct channel and the relaying channel based on the type of the UE communication device.

8. The device of claim 1,
wherein the at least one processor is configured to determine a link quality of at least one of the direct channel and the relaying channel, and
wherein the at least one processor is configured to select between the relaying channel and the direct channel based on the link quality.

9. The device of claim 8,
wherein the at least one processor is configured to determine link qualities of both the direct channel and the relaying channel, and
wherein the at least one processor is configured to execute said selecting if the link qualities of both the direct channel and the relaying channel fulfill Quality of Service requirements of the data.

10. The device of claim 1,
wherein the at least one processor is configured to select one of the direct channel and the relaying channel based on a type of the data autonomously of a terminal of the radio interface.

11. The device of claim 1,
wherein the communication device is a mobile device of a group comprising a mobile phone, a smartphone, a personal digital assistant, a mobile music player, a smart watch, a wearable electronic equipment, a camera, an event data recorder, a sensor, an actuator, and a mobile computer.

12. The device of claim 1,
wherein the at least one processor is configured to autonomously discover a relay as an intermediate node of the relaying channel.

13. The device of claim 12, wherein the relay is a network node of the cellular network.

14. The device of claim 1,
wherein in response to selecting the relaying channel, sending a control message to a relay, the relay being an intermediate node of the relaying channel, said control message prompting the relay to establish the relaying channel.

15. The device of claim 1,
wherein the relaying channel is a device-to-device relaying channel.

16. A method, comprising:
communicating, using at least one processor of a User Equipment (UE) communication device connected to a cellular network by a radio interface, a control message to prospectively indicate a relative priority between a relaying channel and a direct channel of the radio interface of the cellular network;
subsequently, in a situation where the direct channel and the relaying channel of the radio interface are available to transmit data scheduled for transmission in a transmit buffer:
analyzing the data scheduled for transmission in the transmit buffer;
selecting between the relaying channel and the direct channel based on a type of the data derived from the analyzing, wherein the direct channel is selected for a first type of data, and the relaying channel is selected for a second type of data in accordance with the indicated relative priority; and
transmitting the data employing the selected one of the direct channel and the relaying channel.

17. The device of claim 1, wherein the type of the data derived from the analyzing corresponds to uplink data or downlink data; and/or wherein the type of the data derived from the analyzing corresponds to sporadic data or periodic data.

18. The device of claim 1, wherein the control message is communicated during registration of a communication device associated with the direct channel and the relaying channel with the cellular network.

19. The method of claim 16, wherein the relaying channel comprises a network node of the cellular network as an intermediate node.

\* \* \* \* \*